No. 886,178. PATENTED APR. 28, 1908.
A. BÖTTGHER.
BAND CUTTER AND FEEDER.
APPLICATION FILED JULY 20, 1906.

4 SHEETS—SHEET 1.

Witnesses:
W. M. Avery
J. P. Davis

Inventor:
Alfred Böttcher
By Munn & Co
Attorneys

No. 886,178. PATENTED APR. 28, 1908.
A. BÖTTCHER.
BAND CUTTER AND FEEDER.
APPLICATION FILED JULY 20, 1906.

4 SHEETS—SHEET 2.

Witnesses:
W. M. Avery
J. P. Davis

Inventor:
Alfred Böttcher
By Munn & Co
Attorneys

No. 886,178.
A. BÖTTCHER.
BAND CUTTER AND FEEDER.
APPLICATION FILED JULY 20, 1906.
PATENTED APR. 28, 1908.
4 SHEETS—SHEET 3.
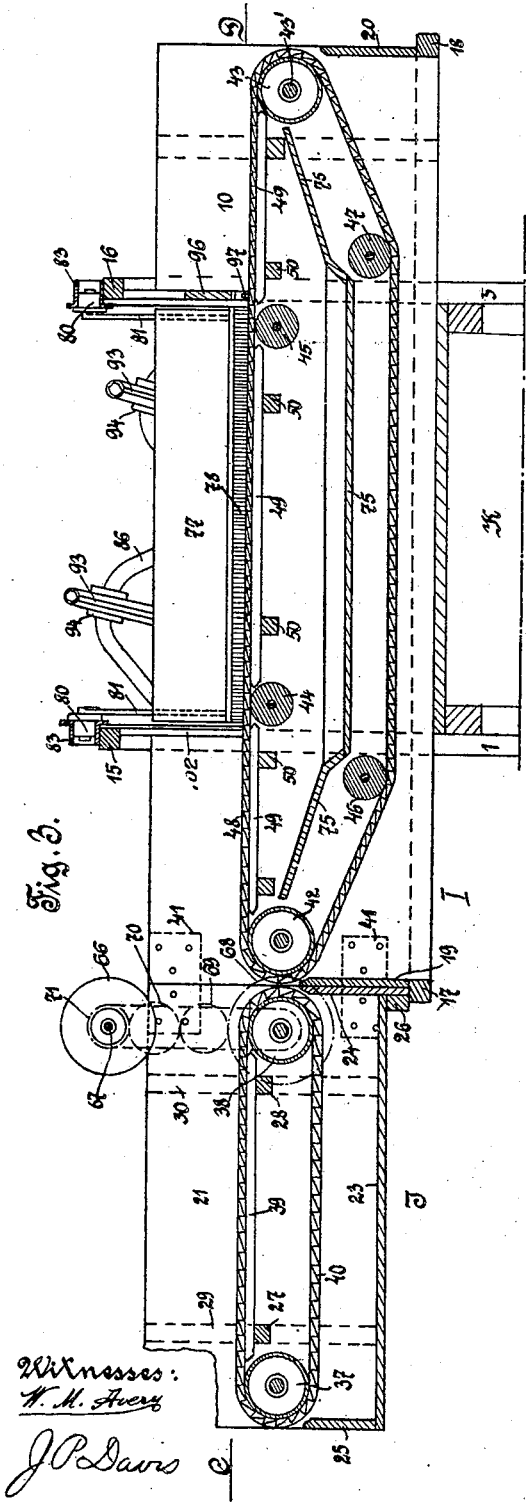
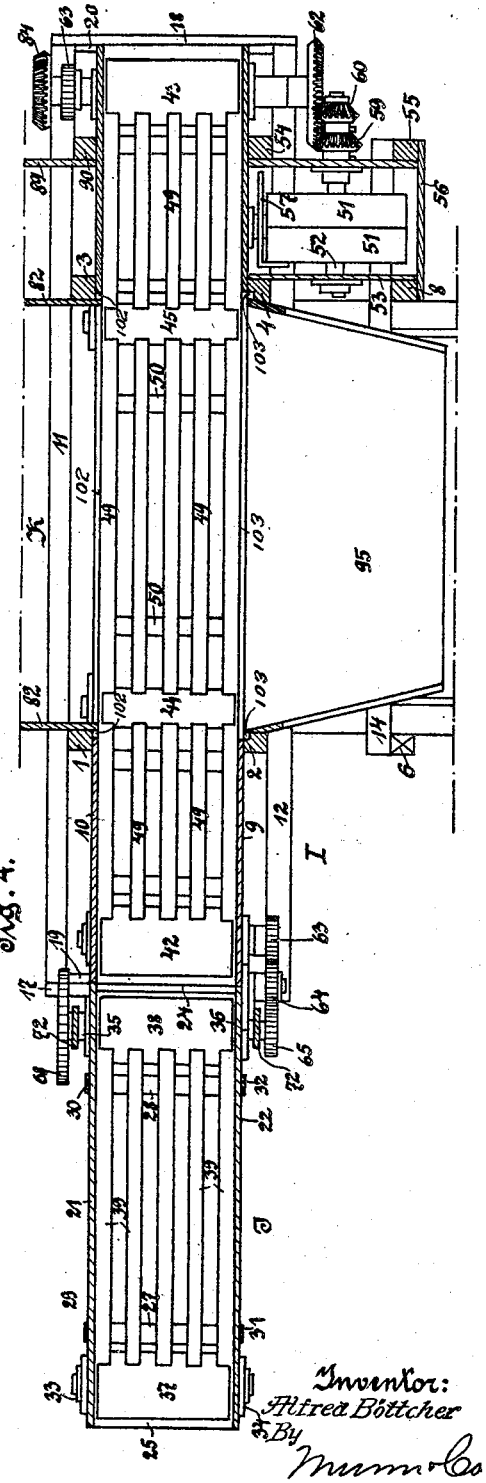

No. 886,178. PATENTED APR. 28, 1908.
A. BÖTTCHER.
BAND CUTTER AND FEEDER.
APPLICATION FILED JULY 20, 1906.
4 SHEETS—SHEET 4.

Witnesses:
W. M. Avery
J. P. Davis

Inventor:
Alfred Böttcher
By Munn & Co
Attorneys

UNITED STATES PATENT OFFICE.

ALFRED BÖTTCHER, OF BENNDORF, NEAR DELITZSCH, GERMANY.

BAND-CUTTER AND FEEDER.

No. 886,178.  Specification of Letters Patent.  Patented April 28, 1908.

Application filed July 20, 1906. Serial No. 327,106.

*To all whom it may concern:*

Be it known that I, ALFRED BÖTTCHER, a citizen of the Empire of Germany, residing at Benndorf, near Delitzsch, in the Empire of Germany, have invented a new and useful Band-Cutter and Feeder, of which the following is a specification.

There are known band cutters and feeders with knives for cutting the bands of sheaves and feeding the grain to the drums of ordinary threshing machines, but they are not suitable for those threshers, in which the grain is placed parallel to the axis of the threshing drum and is in this position fed to the latter, unless the band cutters and feeders comprise endless traveling feed-carriers both in the cross and in the longitudinal directions of the thresher, whereby of course they would be rendered too complicated.

My invention consists of a band cutter and feeder which is suitable for threshers of the special kind described above and comprises two endless traveling feed-carriers in the cross direction only of the thresher, a reciprocating pusher movable in the longitudinal direction of the thresher and adapted to push the grain off the one feed-carrier to a chute leading to the threshing drum, an adjustable band-cutting disk and a reversible box for supporting the other feed-carrier and the band cutting disk.

I will now proceed to describe my invention with reference to the accompanying drawings, in which—

Figure 1:
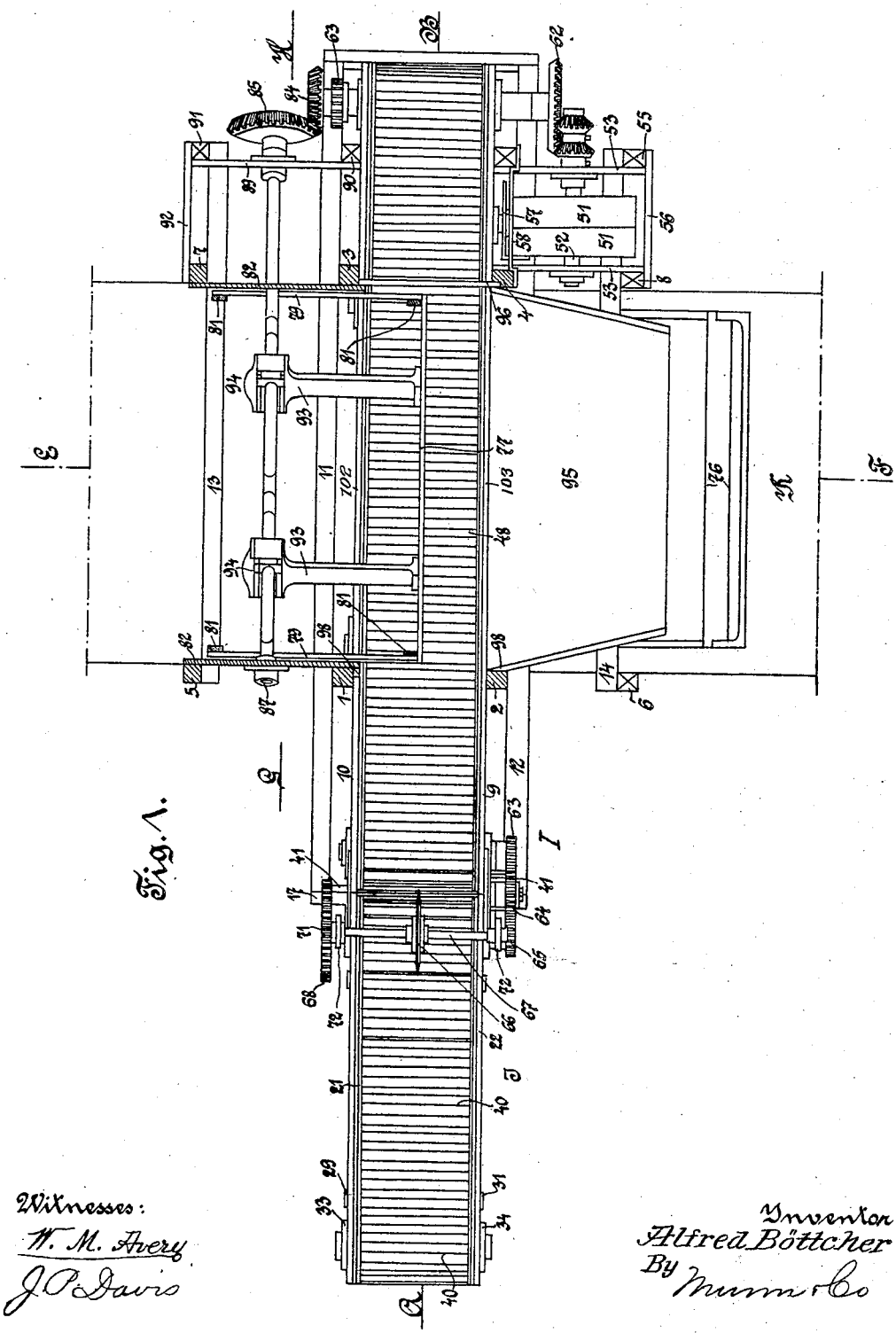
Figure 2:
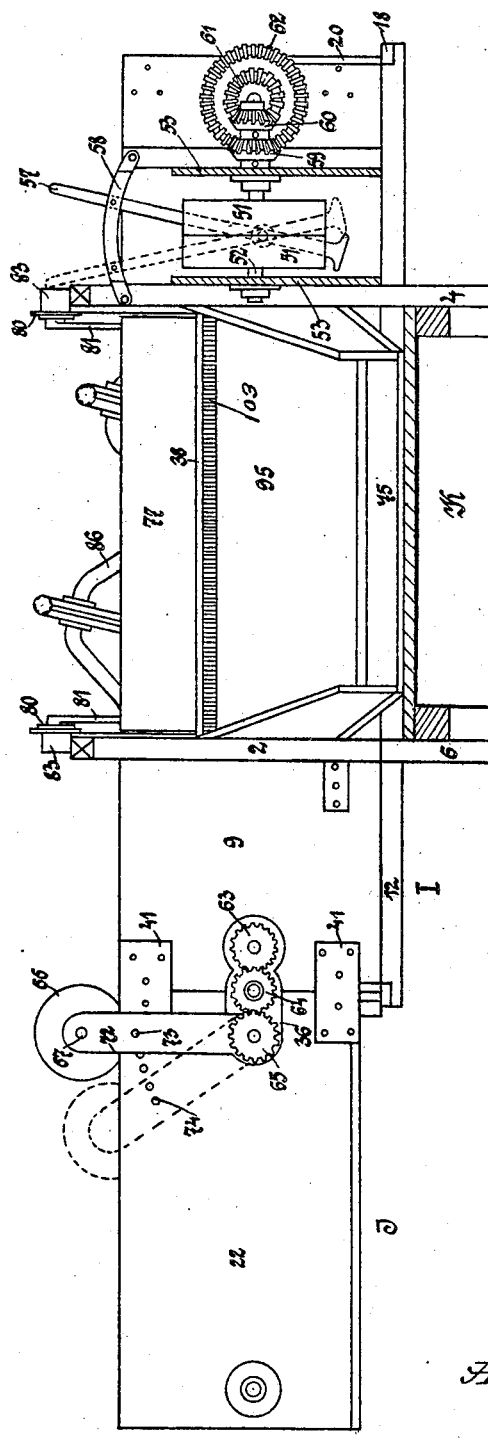
Figure 5:
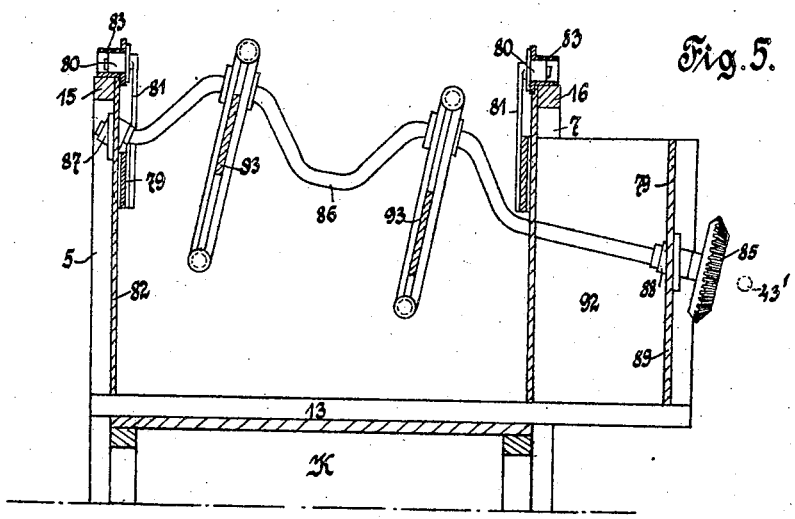
Figure 6:
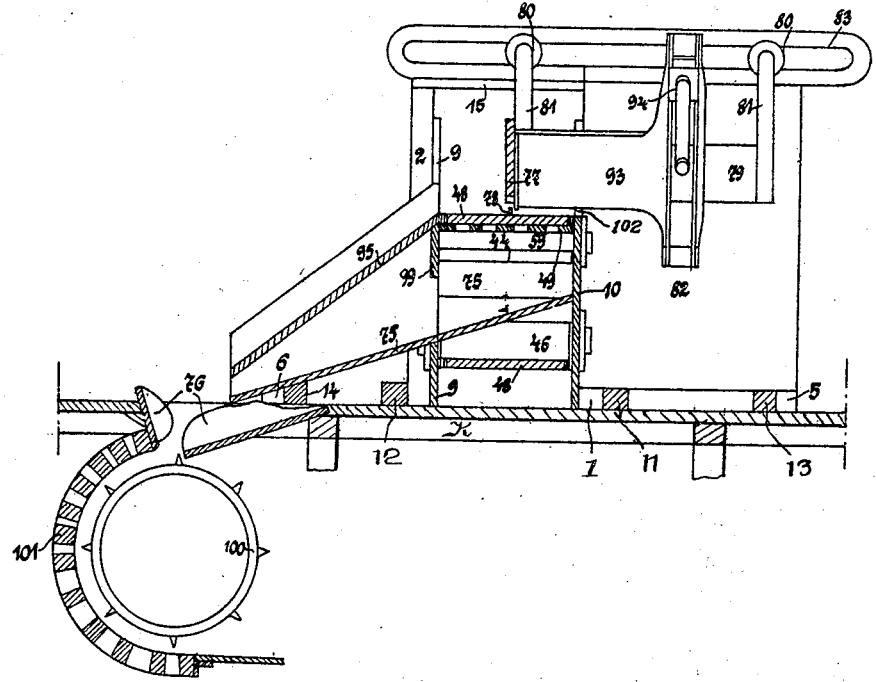

Figure 1 is a plan of the band cutter and feeder, a part of the special thresher being shown in out-lines, Fig. 2 is an elevation of the same, parts being shown in section, Fig. 3 is a vertical longitudinal section through the same on the line A—B in Fig. 1, Fig. 4 is a horizontal section through the same on the line C—D in Fig. 3, Fig. 5 is a vertical section through the line G—H in Fig. 1, and Fig. 6 is a vertical cross section through the band cutter and feeder and a longitudinal section through a part of the frame, the hopper and the drum of the thresher on the line E—F in Fig. 1, seen from right to left.

Similar characters of reference refer to similar parts throughout the several views.

The band cutter and feeder is made in two parts I and J, of which the one I is disposed on the special thresher K and the other part J is a detachable and reversible box, that may be connected with the part I on either side of the thresher. Of the thresher K I have shown only a part of the frame, which may be of any known construction. The stationary part I may be formed of several vertical posts 1, 2, 3, 4, 5, 6, 7 and 8 fastened on the thresher K, two vertical parallel boards 9 and 10 fastened on the internal posts 1, 3, 2 and 4 respectively, several horizontal beams 11, 12, 13 and 14 fastened on the thresher K, two horizontal beams 15 and 16 connecting the upper ends of the posts 2, 1 and 5, also 4, 3 and 7 respectively, two cross beams 17 and 18 connecting the ends of the two long beams 11 and 12, and two end boards 19 and 20. The detachable and reversible box J may be formed of two vertical parallel boards 21 and 22, a bottom 23, two end boards 24 and 25, a cross beam 26 below and two cross beams 27 and 28 above for connecting the parallel boards 21 and 22, on which they are secured by means of vertical metallic strips 29, 30, 31 and 32 and bolts not shown. Thereby a box open at the top is formed. Suitable bearings 33, 34, 35 and 36 (Fig. 4) are fastened on the boards 21 and 22 and serve for supporting the shafts of two rollers 37 and 38. Several parallel laths 39, 39 are secured on the cross beams 27 and 28 for supporting an endless traveling feed carrier 40 of any known construction. As the end boards 24 and 25 reach upwards only to the rollers 37 and 38, a channel will be formed for the grain or sheaves by the upper parts of the two longitudinal boards 21 and 22 and the upper part of the feed carrier 40. The detachable and reversible box J can be placed with its beam 26 on the cross beam 17 or 18 at either end of the part I and can be connected therewith by means of plates 41, 41 and bolts.

Suitable bearings are disposed on the longitudinal boards 9 and 10 of the part I for supporting the shafts of two end rollers 42 and 43, two guiding rollers 44 and 45 and two tightening rollers 46 and 47, round which an endless traveling feed-carrier 48 passes. Of course the bearings of the two tightening rollers 46 and 47 are made adjustable in any known manner, slots being for instance provided in the boards 9 and 10 for the bolts and shafts. The upper part of the feed-carrier 48 is supported by three series of longitudinal laths 49, 49, which are placed on cross beams 50, 50. For driving the two endless feed-carriers 40 and 48 two pulleys 51, 51 are disposed on a horizontal shaft 52, the one pulley being fast and the other loose.

For supporting the bearings of the shaft 52 two vertical parallel boards 53, 53 are provided, which are fastened on the posts 4 and 8 and on additional posts 54 and 55 respectively. The post 55 is fastened on the beam 14 and is connected with the post 8 by means of a board 56. The fast driving pulley 51 is connected with some drum on the thresher by a belt, which can be shifted by means of a forked lever 57, a bow 58 being provided for securing the latter in either of its two positions. If so preferred, two bevel wheels 59 and 60 may be loosely disposed on the shaft 52, with which either of them may be coupled at will by means of screws or the like. The two bevel wheels 59 and 60 mesh with two larger ones 61 and 62 respectively, which are fastened on the shaft $43^1$ of the roller 43. It will be seen, that the feed-carrier 48 can be driven at two different speeds. The motion of the carrier 48 is transmitted to the other feed carrier 40 by means of three gear wheels 63, 64 and 65, of which one 63 is fast on the shaft of the roller 42 and 65 is fast on the shaft of the roller 38. The intermediate gear wheel 64 is loose on a pin, which is fastened in a projection of the bearing 36 for the shaft of the roller 38. It is evident, that a second gear wheel 63 requires to be fastened on the shaft $43^1$ of the roller 43 on the side opposite to the bevel wheels 61 and 62, so that this gear wheel 63 may engage the gear wheel 64, if the part J is to be attached to the part I on its right side in Figs. 1 and 4.

For cutting the bands of the sheaves I employ a circular knife 66 on a shaft 67, which latter is driven from the shaft of the roller 38 by means of suitable gear wheels 68, 69, 70 and 71 (see Fig. 3, where they are indicated by dotted circles). As the diameter of the sheaves may vary, the band-cutter 66 is preferably made adjustable, its shaft 67 being mounted to turn in two arms 72, 72, which are turnable on the bearings 35 and 36 and can be adjusted by means of a pin 73 engaging in either of several holes 74 (Fig. 2) in the board 22. For collecting the corns that may drop from the grain a hopper 75 (Figs. 2, 3 and 6) is preferably disposed between the two parts of the feed-carrier 48 and is arranged for conducting the corns towards the hopper 76 of the thresher.

The longitudinal board 10 is in the middle of its upper slotted at 102 (Figs. 3, 4 and 6) and in this slot 102 a pusher 77 can engage. This pusher is provided at its bottom edge with a brush 78, which can sweep the upper surface of the feed-carrier 48. The pusher 77 is to reciprocate in the cross direction of the feed-carrier 48 and may move through a distance like the breadth of the latter. It is connected with two arms 79, 79 at right angles to it and these arms are suspended from rollers 80, 80 by means of rods 81, 81 and are guided by boards 82, 82 fastened on the posts 1, 5, 3 and 7 respectively. The rollers 80, 80 are arranged to roll in guides 83, 83 made from angle iron and fastened on the beams 15 and 16. Fastened on the shaft of the roller 43 is a bevel wheel 84, which meshes with another bevel wheel 85. The latter is keyed upon a doubly cranked shaft 86 mounted to turn in two bearings 87 and 88, of which the one 87 is fastened on the one board 82 and the other 88 on a special board 89. This board 89 is connected with the longitudinal board 10 by means of a post 90 and with the post 7 by means of a special post 91 and a board 92. The pusher 77 is rigidly connected with two slotted arms 93, 93, in the slots of which the two cranks of the shaft 86 engage by means of sliding bearings 94, 94. It will be seen, that during the rotation of the roller 43 the pusher 77 will be reciprocated. The ratio of the two bevel wheels 84 and 85 and the diameter of the roller 43 may be so chosen, that a point on the feed-carrier travels through a distance like the length of the pusher 77 about in the same time, as the latter makes one stroke. The longitudinal board 9 is slotted at 103 (Figs. 2 and 4) in the same manner as the board 10 and moreover it is provided with an opening 99 for the hopper 75, see Fig. 6. A chute 95 is provided above the bottom of the external part of the hopper 75 and reaches upwards to the cut 103, that is, the longitudinal edge of the upper part of the feed-carrier 48. A slide 96 provided at its bottom edge with a brush 97 is inserted in suitable grooves and serves for sweeping the surface of the feed-carrier 48 and for checking the grain. When the part J is to be placed on the right side of the part I in Fig. 1, of course the slide 96 will require to be inserted in other grooves 98.

The charger is operated as follows: According to the size of the sheaves the band-cutter 66 is adjusted and the belt shifter 57 is brought into the other position to start the driving pulley 51. A sheaf or a quantity of grain, as the case may be, is placed on the first feed-carrier 40 about at the moment at which the pusher 77 occupies its extreme position in the plane of the board 10. The grain passes with the feed carrier 40 and afterwards with the other carrier 48 and its band (if there is any) is cut through by the cutter 66. The grain strikes against the slide 96 and stops about at the moment at which the pusher 77 again occupies its position in the plane of the board 10. The pusher 77 will then proceed to push the grain in the longitudinal direction of the thresher, so that the grain slides down the chute 95 into the hopper 76 and passes between the threshing drum 100 and its screen 101 to be thereby threshed as usual.

The band cutter and feeder may be varied in many respects without departing from the spirit of my invention. The length of the pusher 77 may be smaller than that of the hopper 76 and the slide 96 may be placed obliquely, so as to push the grain off the feed-carrier 48 to the chute 95. If there are no sheaves, the part J may be left out and the grain may be placed direct on the feed-carrier 48 at the proper moment so as to pass along the pusher 77 and to be thereby pushed off.

I claim:

1. In a band-cutter and feeder, the combination with a thresher frame, of a threshing drum in said thresher frame in its cross direction, an endless feed-carrier above said thresher frame and parallel to said threshing drum, a chute in the longitudinal direction of said thresher frame and leading from one longitudinal edge of said endless feed-carrier downwards to said threshing drum, a pusher reciprocating in the longitudinal direction of said thresher frame and adapted to push the grain off said endless feed-carrier to said chute, a reversible endless-feed-carrier adapted to be connected with either end of said endless feed-carrier, and means for driving said endless feed-carrier, said reversible feed-carrier and said pusher.

2. In a band-cutter and feeder, the combination with a thresher frame, of a threshing drum in said thresher frame in its cross direction, an endless feed-carrier above said thresher frame and parallel to said threshing drum, a chute in the longitudinal direction of said thresher frame and leading from one longitudinal edge of said endless feed-carrier downwards to said threshing drum, a pusher reciprocating in the longitudinal direction of said thresher frame and adapted to push the grain of said endless feed-carrier to said chute, a reversible endless feed-carrier adapted to be connected with either end of said endless feed-carrier, a circular band-cutter above said reversible endless feed carrier and adapted to cut in the longitudinal direction of the latter, and means for driving said endless feed-carrier, said reversible endless feed-carrier, said circular band-cutter and said pusher.

3. In a band-cutter and feeder, the combination with a thresher frame provided with a hopper, of a threshing drum in said thresher frame in its cross direction and beneath the hopper, a box on said thresher frame parallel to said threshing drum and open at the top and provided in its two longitudinal sides with slots of a length approximately corresponding to that of said hopper, an endless feed-carrier in said box and forming with the upper parts of its two longitudinal sides two opposite channels, a chute leading from one slot in said box downwards to said hopper, a pusher reciprocating in the longitudinal direction of said thresher frame and passing through the other slot in said box for sweeping the surface of said endless feed-carrier and pushing the grain off to said chute, and mean for driving said endless feed-carrier and said pusher.

4. In a band-cutter and feeder, the combination with a thresher frame provided with a hopper, of a threshing drum in said thresher frame in its cross direction and beneath the hopper, a box on said thresher frame parallel to said threshing drum and open at the top and provided in its two longitudinal sides with slots of a length approximately corresponding to that of said hopper, an endless feed-carrier in said box and forming with the upper parts of its two longitudinal sides two opposite channels, a circular band-cutter above said endless feed-carrier in one channel of said box and adapted to cut in the longitudinal direction of the latter, a stop in the other channel of said box and adapted to sweep the surface of said endless feed-carrier for stopping the grain, a chute leading from one slot in said box downwards to said hopper, a pusher reciprocating in the longitudinal direction of said thresher frame and passing through the other slot in said box for sweeping the surface of said endless feed-carrier and pushing the grain off to said chute, and means for driving said endless feed-carrier, said circular band-cutter and said pusher.

5. In a band-cutter and feeder, the combination with a thresher frame provided with a hopper, of a threshing drum in said thresher frame in its cross direction and beneath the hopper, a box on said thresher frame parallel to said threshing drum and open at the top and in the upper parts of the end sides and provided in its two longitudinal sides with slots of a length approximately corresponding to that of said hopper, an endless feed-carrier in said box and forming with the upper parts of its two longitudinal sides two opposite channels, a chute leading from one slot in said box downwards to said hopper, a pusher reciprocating in the longitudinal direction of said thresher frame and passing through the other slot in said box for sweeping the surface of said endless feed-carrier and pushing the grain off to said chute, a reversible box adapted to be connected with either end of said box, a second endless feed-carrier in said reversible box, a circular band-cutter above said reversible box and adapted to cut in the longitudinal direction of the latter, and means for driving said two endless feed-carriers, said band-cutter and said pusher.

6. In a band-cutter and feeder, the combination with a thresher frame, of a threshing drum in said thresher frame in its cross direction, an endless feed-carrier above said thresher frame, and parallel to said threshing drum, a chute in the longitudinal direction of said thresher frame and leading from one longitudinal edge of said endless feed-carrier downwards to said threshing drum, a pusher reciprocating in the longitudinal direction of said thresher frame and provided at its lower edge with a brush for sweeping the surface of said endless feed-carrier, it being adapted to push the grain off to said chute, and means for driving said endless feed-carrier and said pusher.

7. In a band-cutter and feeder, the combination with a thresher frame, of a threshing drum in said thresher frame in its cross direction, an endless feed-carrier above said thresher frame and parallel to said threshing drum, a chute in the longitudinal direction of said thresher frame and leading from one longitudinal edge of said endless feed-carrier downwards to said threshing drum, a pusher reciprocating in the longitudinal direction of said thresher frame and provided at its lower edge with a brush for sweeping the surface of said endless feed-carrier, it being adapted to push the grain off to said chute, a crank-shaft adapted to drive said pusher, and a mechanism for actuating said endless feed-carrier and said crank-shaft.

8. In a band-cutter and feeder, the combination with a thresher frame provided with a hopper, of a threshing drum in said thresher frame in its cross direction and beneath the hopper, a box on said thresher frame parallel to said threshing drum and open at the top and provided in its two longitudinal sides with slots of a length approximately corresponding to that of said hopper, an endless feed-carrier in said box and forming with the upper parts of its two longitudinal sides two opposite channels, a chute leading from one slot in said box downwards to said hopper, a pusher reciprocating in the longitudinal direction of said thresher frame and passing through the other slot in said box for sweeping the surface of said endless feed-carrier and pushing the grain off to said chute, a hopper beneath the upper run of said endless feed-carrier and adapted to collect corns that may drop and to conduct them to said hopper, and means for driving said endless feed-carrier and said pusher.

ALFRED BÖTTCHER.

Witnesses:
  MARIE SCHNEIDER,
  ANNA KETELHUT.